United States Patent [19]

Fröschle

[11] 4,016,769
[45] Apr. 12, 1977

[54] INDEXING DRIVE FOR TRANSFER LINES

[75] Inventor: Gerhard Fröschle, Kongen, Germany

[73] Assignee: Cross Europa-Werk GmbH, Wendlingen, Germany

[22] Filed: Jan. 16, 1975

[21] Appl. No.: 541,570

[52] U.S. Cl. .................................................. 74/37
[51] Int. Cl.² ........................................ F16H 19/06
[58] Field of Search ........................... 74/37; 277/2

[56] References Cited

UNITED STATES PATENTS

| | | | |
|---|---|---|---|
| 3,141,685 | 7/1964 | Watts | 277/2 |
| 3,469,459 | 9/1969 | Morin | 74/37 |
| 3,681,918 | 8/1972 | Chanin | 277/2 |
| 3,726,029 | 4/1973 | Deen et al. | 74/37 |
| 3,749,411 | 7/1973 | Lennon | 277/2 |
| 3,857,422 | 12/1974 | Cunningham | 74/37 |

Primary Examiner—Samuel Scott
Assistant Examiner—Wesley S. Ratliff, Jr.
Attorney, Agent, or Firm—Harness, Dickey & Pierce

[57] ABSTRACT

The invention concerns a rhythmic or indexing drive for transfer lines with a timed-bar driver making a reciprocating movement on a frame and couplable to at least one timed bar, wherein a longitudinally displaceable drive element driven by a drive source substantially parallel to the plane of movement of the timed bar, is coupled to the timed bar. Such an indexing drive is characterized by its simple construction, and permits a smooth starting and braking of the timed bar at high transfer speeds during the time of the indexing stroke. The invention senses loosening of the coupling by a pressure drop.

6 Claims, 4 Drawing Figures

INDEXING DRIVE FOR TRANSFER LINES

BACKGROUND OF THE INVENTION

The connection of the timed-bar driver with the drive element has heretofore, as a rule, been by screws. After lengthy operation it is not possible to rule out the danger that such a connection may become loose, so that if this remains unobserved the timed-bar driver may become detached from the drive element. Because of the high transfer speed obtainable with this indexing drive, that would mean that the loosened timed-bar driver would be flung away with relatively great force, which would endanger the entire transfer line and its personnel.

BRIEF SUMMARY OF THE INVENTION

The invention therefore has the fundamental object of improving the timed-bar drive so that such an accidental loosening of the timed-bar driver from the drive element is made impossible in that even a loosening of the connection between the timed-bar driver and the drive element could be indicated, so that either the source of drive could be immediately shut off, or the connection between the timed-bar driver and the drive element could be checked.

For the achievement of this object, the aforesaid indexing drive is characterized in that, at the place of connection between the timed-bar drive and the drive element, there are present at least two associated surfaces sealingly pressed together by connecting means and impinged by a medium under pressure, and characterized in that the pressure impingement of the surfaces is continuously monitored by a sensing device that gives a signal at a decrease of pressure. The pressure impingement of the two associated surfaces at the place of connection can be produced in a simple way by means of compressed air. This requires no fundamental structural changes in the region of the connection between the timed-bar driver and the drive element. The response time of the arrangement is relatively high, because even with a slight loosening of the associated surfaces through a loosening of their connecting means a slight gap occurs between the surfaces, through which the pressure of the medium becomes decreased. The signal then emitted by the sensing device may for example be used to shut off the drive source of the indexing drive. It may however merely emit a warning, for example a horn.

In one preferred practical form of construction the arrangement may be such that the timed-bar driver is connected with the drive element by at least one connection member fastened laterally to the timed-bar driver, which forms one of the two associated surfaces at the connecting member. The connecting member may have a through bore, to which one of the pressure lines conducting the pressure medium is sealingly connected.

Very simple conditions result when the connecting piece is, on the one hand, connected with the timed-bar driver and on the other hand with an arm fastened to the drive-element body, and the other of the two associated surfaces is formed on the arm.

The sensing device, which responds to a decrease of the pressure of the medium at a loosening of the connection between the timed-bar driver and the drive element, is with advantage an electric pressure switch, dependent on the nature of the drive source used for the case under consideration; but any other suitable sensing device may be used.

BRIEF DESCRIPTION OF THE DRAWINGS

The drawing shows an example of construction of the subject of the invention, where.

DESCRIPTION OF THE PREFERRED EMBODIMENT

Figure 1:
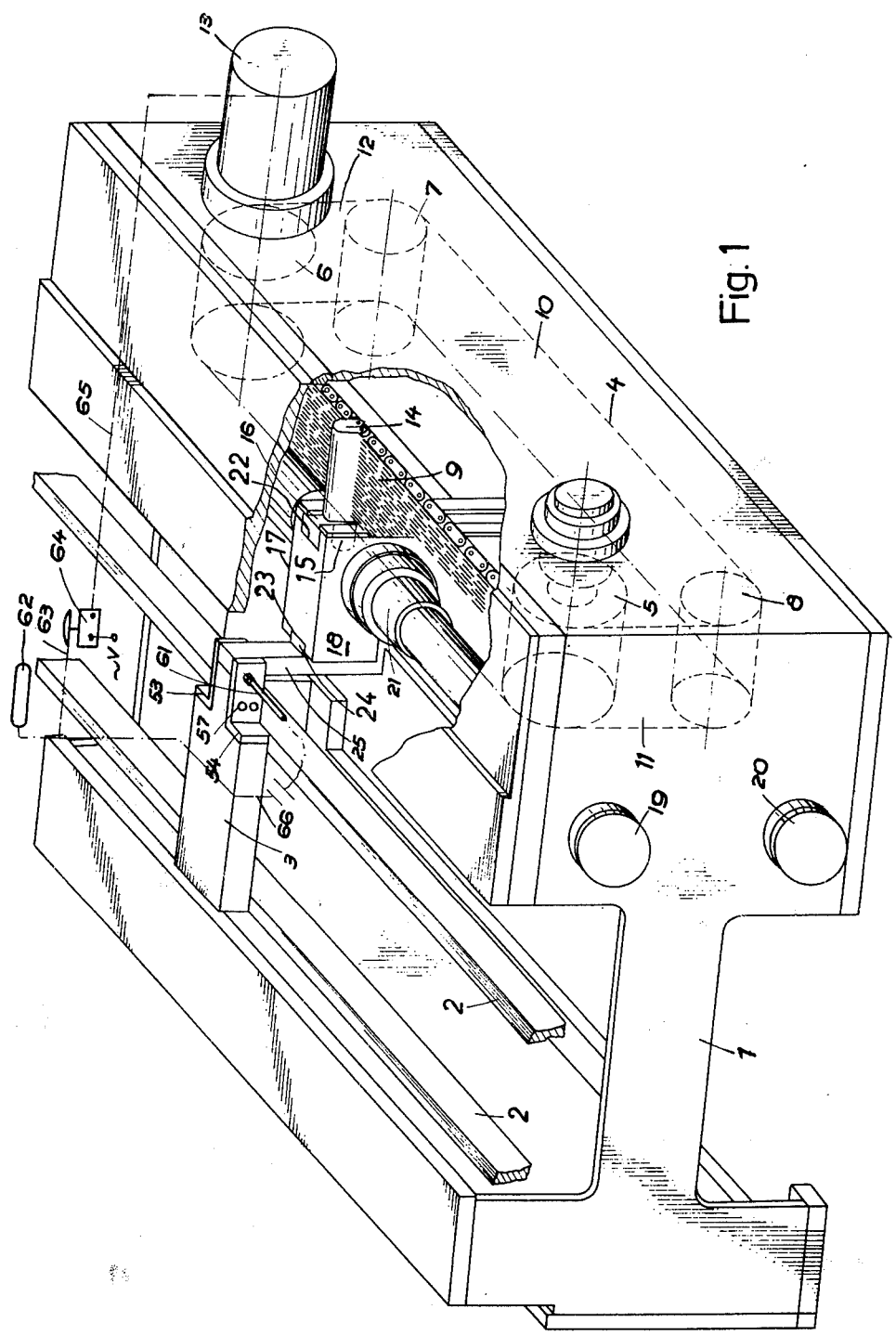
FIG. 1 shows schematically an indexing drive according to the invention in a partly sectioned perspective view.

The indexing drive shown in FIG. 1 is housed in a frame 1, on which two timed bars 2 are guided so that they can move in their lengthwise direction to and fro, carrying along workpieces which are not shown in the drawing and which advance with their timed stroke. The timed bars 2 in their reciprocating movement move in a substantially horizontal plane. They are connected with a timed-bar driver 3 by which they are driven as shown in detail in FIG. 2.

The drive of the timed-bar driver 3 is through the intermediary of an endless driven chain 4, driven as shown in FIG. 1 by four sprocket wheels 5, 6, 7, 8 over which it runs. The parallel-axis sprocket-wheels 5 to 8 are disposed so that length 9 and lower length 10 of the endless chain run substantially parallel to the plane of movement of the timed bar 2, i.e. a horizontal plane, while the two other lengths 11, 12, run at right angles to this plane.

Sprocket wheel 6 is driven directly by a drive motor 13, in the form of a driving electric motor, and sprocket wheel 6 has, for example, a speed of 40 rpm.

Chain 4 carries an entrainment means or driver 14, which has a laterally projecting drive-pin 15 engaging in a slide member 16 of a slideway 17. Slideway 17 consists of an elongated slideway element 18, piloted longitudinally on two guide rods 19, 20, anchored in the frame 1 one above the other. Slideway element 18 is provided with guide bushings 21, which ensure perfect bearing conditions. In the side of slideway element 18 facing endless chain 4 there is formed a groove 22 running transversely of the plane of movement of the timed bar 2, in which groove there is piloted for reciprocation slide member 16, so that there is produced a form-coupled coupling between driver 14 and slideway 17. Slideway element 18 and groove 22 are of such a length that slide member 16 always remains piloted in groove 22 during the entire circulation of driver 14 along the closed path of chain 14.

At the side of slideway element 18 opposite groove 22 a second groove 23 is formed parallel to groove 22, and into which is inserted a wedge 24, which is fastened immovably to the timed-bar driver 3 by an arm 25.

The indexing drive which has been described so far operates as follows: When drive motor 13 drives endless chain 4, and driver 14 is situated in one of the horizontal lengths 9, 10, slideway 17 is carried along through the intermediary of drive pin 15 and slide member 16, so that it makes a lengthwise movement on guide rods 19, 20, while timed bars 2 become moved longitudinally in the corresponding direction through the intermediary of timed-bar driver 3. When, during a counterclockwise circulation of endless chain 4, driver 14 arrives at sprocket wheel 5, it becomes deviated into the vertical length 11. Thus the longitudinal movement of slideway 17 ceases, because when the driver runs through vertical length 11, only slide member 16 moves downwardly in the immovably held slideway element 18.

Figure 2:
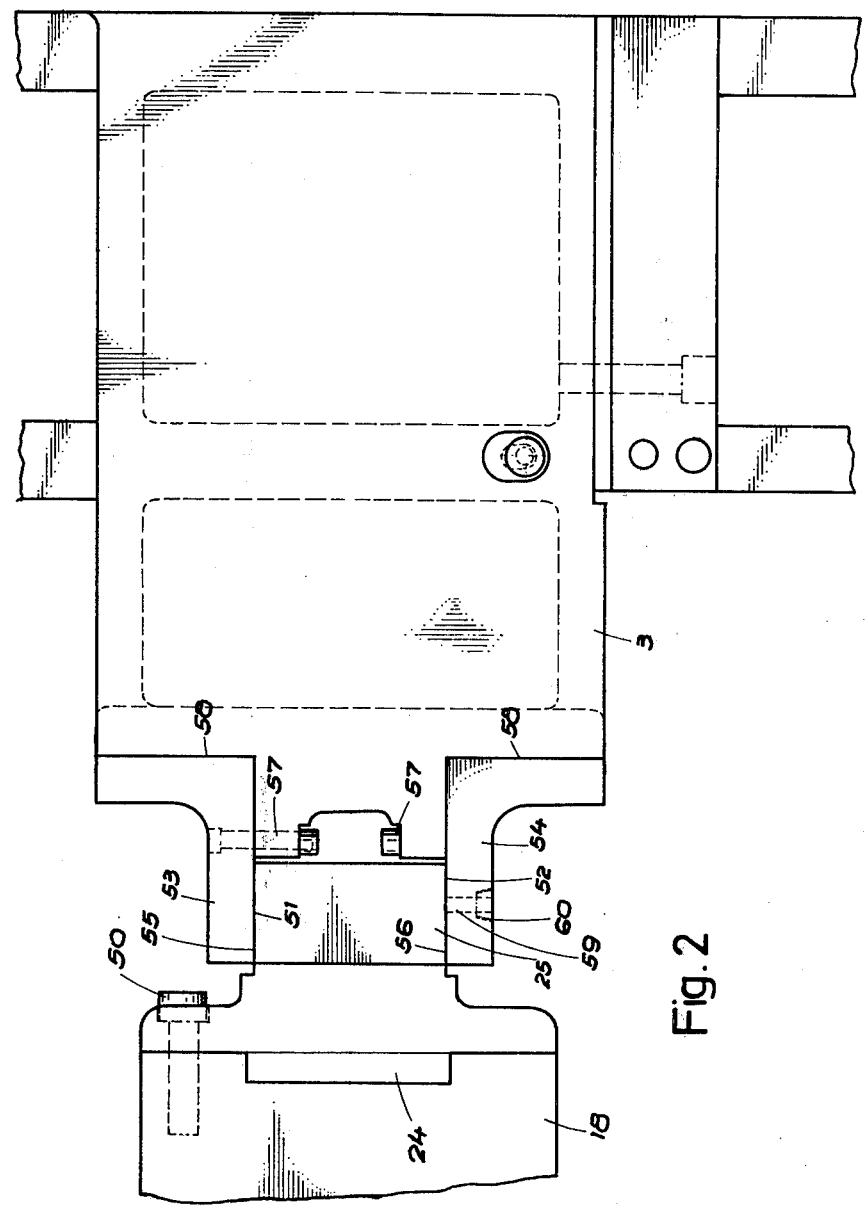
FIG. 2 shows the timed-bar driver of the indexing drive of FIG. 1 in a plan view and to another scale.
Figure 3:
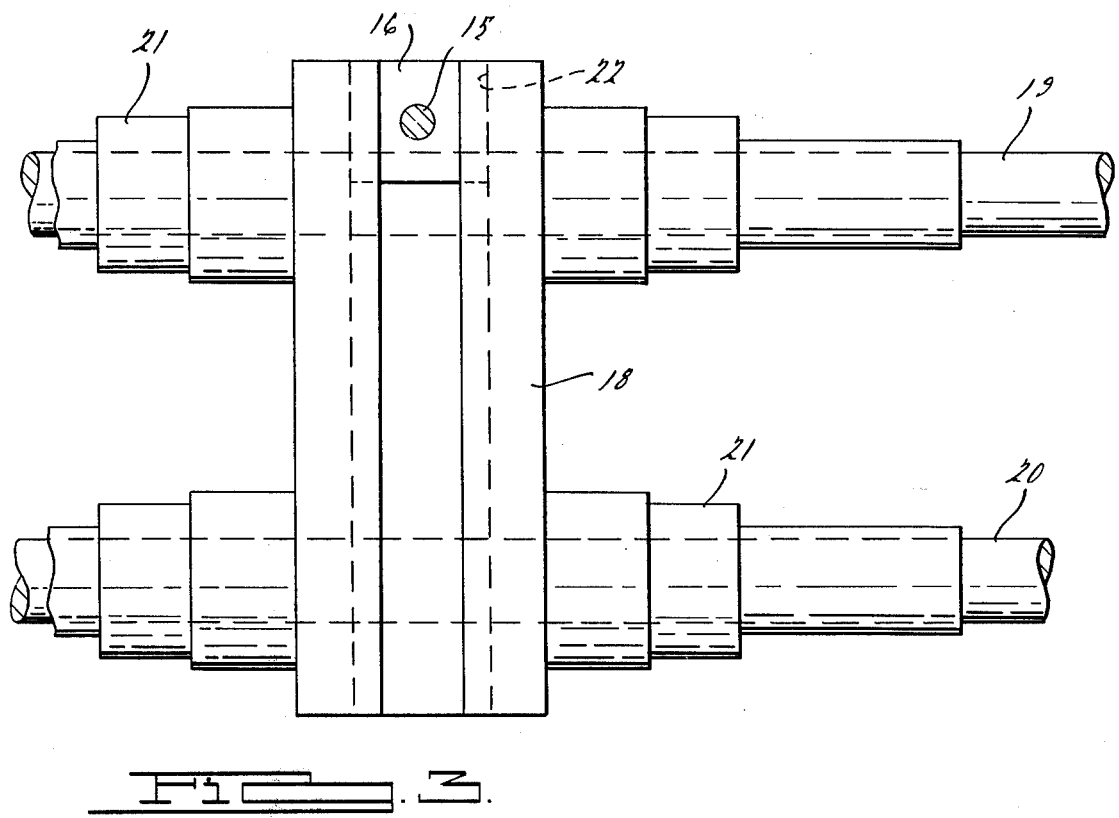
FIG. 3 shows an elevational view of the slideway element looking in the direction from the endless chain, parts being broken away for clarity.
Figure 4:
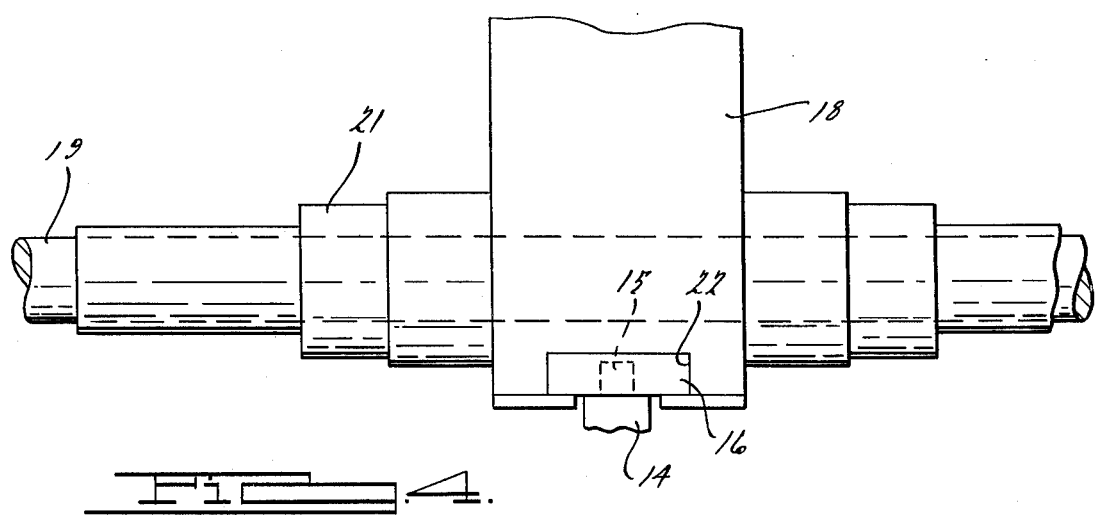
FIG. 4 is a fragmentary top plan view of the slide element.

The connection between arm 25 fastened to slideway element 18 and the timed-bar driver 3 is shown in detail in FIG. 2.

The substantially L-shaped arm 25 is attached by screws 50 (only one of which is shown) to slideway element 18. It has two parallel and opposite plane surfaces 51, 52, on which are set two angle members 53, 54, which serve as connecting pieces, and which have plane surfaces 55 and 56 facing surfaces 51 and 52 respectively. Angle members 53, 54 are connected by means of screws 57 with the plate-like timed-bar driver 3. They are also set in angular cut-outs 58 of timed-bar driver 3, so that perfect holding is ensured.

The two angle members 53, 54, connected by screws 57 with timed-bar driver 3, embrace both sides of the arm 25 in the manner shown in FIG. 2, the fine-machined pairs of surfaces 51, 55 and 52, 56 respectively being pressed sealingly together by means of screws 57, so that a tight positive connection is ensured between the arm 25 and the timed-bar driver 3.

A through passage 59 is formed in angle member 54, provided with an associated threaded extension 60 into which is sealingly screwed a pressure line 61 (FIG. 1). This line 61 is connected with a pressure-medium supply, e.g. a compressed air bottle, so that it is always filled with the medium under pressure, which through passage 59 impinges the two associated surfaces 52, 56.

As long as the connection between arm 25 and timed-bar driver 3 is perfect, i.e. screws 57 have not become loosened or angle members 53, 54, have not in some other manner become loosened, the gap between associated surfaces 52, 56 is sealed, so that no medium under pressure is able to escape. However, as soon as the connection produced by angle members 53, 54, between arm 25 and timed-bar driver 3 begins to loosen, the medium under pressure is able to escape between associated faces 52, 56. Thus the pressure of the medium in line 61 decreases. With the pressure line 61 there is however connected, over the line 63, a pressure switch 64, which responds to a pressure decrease in pressure line 61, and through the intermediary of an electric line 65 emits a signal, which is for example used to stop the electric motor 13, as indicated schematically in FIG. 1. The electric signal appearing in line 65 may however also be used for an indication, e.g. for activating a horn or displaying a warning light.

Pressure line 61 is moreover made, at least for a part of its length, as a kind of flexible hose, so that it is able to follow the reciprocating movement of timed-bar driver 3, as shown schematically at 66.

What is claimed is:

1. In an indexing drive for transfer lines of the type having a timed-bar driver supported for reciprocating movement on a frame and couplable to at least one timed-bar, a longitudinally displaceable drive element driven by a drive source substantially parallel to the plane of movement of the timed bar, means supporting said drive element for linear reciprocating movement, means continuously coupling the drive element to the timed-bar driver, at least two associated surfaces at said coupling means, said surfaces extending transversely to the direction of said reciprocating movement, connecting means constantly and sealingly pressing said surfaces together, means causing a medium under pressure to impinge on said surfaces at their plane of contact, and a sensing device continuously monitoring said pressure impingement and responsive to a pressure decrease to emit a signal.

2. An indexing drive in accordance with claim 1, said coupling means comprising a member connecting said timed-bar driver with said drive element, said connecting member being fastened laterally to said timed-bar driver, one of the surfaces of said two associated surfaces being formed on said connecting member.

3. An indexing drive in accordance with claim 2, said connecting member having a passage extending therethrough, and a pressure line sealingly connected to said passage and conducting the medium under pressure.

4. An indexing drive in accordance with claim 2, said connecting member being connected at one side with said timed-bar driver and at the other side with an arm fastened to a drive-part element, the other of the two associated surfaces being formed on said arm.

5. An indexing drive in accordance with claim 1, said sensing device being an electric pressure switch.

6. An indexing drive in accordance with claim 1, said longitudinally displaceable drive element comprising an arm having oppositely facing surfaces, said coupling means comprising a pair of members secured to said timed-bar driver and having portions disposed on opposite sides of said drive element, said portions having surfaces in contact with said oppositely facing surfaces of the drive element, said means pressing said surfaces together comprising fasteners mounted on said timed-bar driver and drawing said members against said oppositely facing surfaces of the drive element.

* * * * *